(12) United States Patent
Bontu et al.

(10) Patent No.: US 10,021,704 B2
(45) Date of Patent: Jul. 10, 2018

(54) SYSTEM AND METHOD FOR TOGGLING TRANSMISSION PARAMETERS IN A HETEROGENEOUS NETWORK

(71) Applicant: Telefonaktiebolaget L M Ericsson (publ), Stockholm (SE)

(72) Inventors: Chandra Sekhar Bontu, Nepean (CA); Jianguo Long, Kanata (CA); Xixian Chen, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 14/405,436

(22) PCT Filed: Oct. 29, 2014

(86) PCT No.: PCT/IB2014/065692
§ 371 (c)(1),
(2) Date: Dec. 4, 2014

(87) PCT Pub. No.: WO2016/067077
PCT Pub. Date: May 6, 2016

(65) Prior Publication Data
US 2016/0278102 A1    Sep. 22, 2016

(51) Int. Cl.
*H04B 7/216* (2006.01)
*H04L 1/00* (2006.01)
(Continued)

(52) U.S. Cl.
CPC ........ *H04W 72/085* (2013.01); *H04B 7/0632* (2013.01); *H04L 1/0003* (2013.01);
(Continued)

(58) Field of Classification Search
CPC .... H04W 72/085; H04L 5/005; H04L 5/0051; H04L 5/0053; H04L 5/0057; H04L 5/006; H04L 5/0048
(Continued)

(56) References Cited

U.S. PATENT DOCUMENTS 7,697,948 B2    4/2010  Wan et al.
8,675,794 B1 *  3/2014  Perets ............... H04L 1/0003
                                                      375/225
(Continued)

FOREIGN PATENT DOCUMENTS

WO    WO 2009/157632 A1   12/2009
WO    WO 2011/105827       9/2011
WO    WO 2013/183824      12/2013

OTHER PUBLICATIONS

PCT International Search Report for International application No. PCT/IB2014/065692, dated Jul. 13, 2015.
(Continued)

*Primary Examiner* — Alpus H Hsu
*Assistant Examiner* — Camquyen Thai
(74) *Attorney, Agent, or Firm* — Baker Botts, LLP

(57) ABSTRACT

According to certain embodiments, methods and systems for toggling transmission parameters in a heterogeneous network to achieve a target block error rate by a network node may include obtaining a signal-to-noise ratio (SINR) estimate from channel quality information for a downlink between a network node and a wireless device. For each of a first code word and a second code word to be transmitted on the downlink, a block error rate estimate may be obtained based on the SINR estimate. The network node may then determine at least one expected SINR for the first code word and the second code word. The at least one expected SINR may be determined as a function of the SINR estimate and the block error rate estimate. Based on the at least one
(Continued)

expected SINR for the first code word and the second code word, a modulation and coding scheme (MCS) for obtaining a target block error rate may be selected. The network node may then transmit the first code word on a first transmission layer and the second code word on a second transmission layer during a first transmission time interval. In a second transmission time interval, the network node may transmit the first code word on the second transmission layer and the second code word on the first transmission layer.

16 Claims, 10 Drawing Sheets

(51) Int. Cl.
  *H04L 1/08* (2006.01)
  *H04W 72/08* (2009.01)
  *H04B 7/06* (2006.01)
  *H04L 1/20* (2006.01)
  *H04W 72/04* (2009.01)
  *H04L 1/16* (2006.01)

(52) U.S. Cl.
  CPC .......... *H04L 1/0026* (2013.01); *H04L 1/0035* (2013.01); *H04L 1/20* (2013.01); *H04W 72/042* (2013.01); *H04W 72/0466* (2013.01); *H04L 1/0009* (2013.01); *H04L 1/1607* (2013.01)

(58) Field of Classification Search
  USPC .......... 370/329, 330; 375/349, 329; 455/69, 455/127.1, 455.2, 458
  See application file for complete search history.

(56) References Cited

U.S. PATENT DOCUMENTS

| | | | |
|---|---|---|---|
| 8,687,527 B2 | 4/2014 | Jiang et al. | |
| 9,203,589 B1* | 12/2015 | Perets | H04L 5/0057 |
| 2004/0137860 A1* | 7/2004 | Oh | H04W 52/12 455/127.1 |
| 2006/0293075 A1* | 12/2006 | Kansakoski | H04W 52/12 455/522 |
| 2010/0118856 A1* | 5/2010 | Krishnamurthy | H04L 1/0026 370/342 |
| 2011/0142001 A1* | 6/2011 | Ko | H04B 7/0678 370/329 |
| 2013/0028213 A1* | 1/2013 | Ko | H04B 7/0623 370/329 |
| 2013/0084893 A1* | 4/2013 | Saito | H04W 24/10 455/458 |
| 2013/0128759 A1 | 5/2013 | Luo et al. | |
| 2013/0170455 A1 | 7/2013 | Lee et al. | |
| 2013/0170469 A1* | 7/2013 | Yu | H04L 1/0003 370/330 |
| 2013/0182569 A1 | 7/2013 | Bertrand et al. | |
| 2013/0315153 A1* | 11/2013 | Sebeni | H04L 1/0001 370/329 |
| 2013/0324145 A1* | 12/2013 | Tabet | H04W 72/085 455/452.2 |
| 2014/0369340 A1* | 12/2014 | Horvat | H04W 56/0005 370/350 |

OTHER PUBLICATIONS

"A Fading-Insensitive Performance Metric for a Unified Link Quality Model" by Lei Wan et al., Apr. 2006.

3GPP TS 36.212 V12.1.0; Technical Specification; 3rd Generation Partnership Project; Technical Specification Group Radio Access Network; Evolved Universal Terrestrial Radio Access (E-UTRA); Multiplexing and Channel Coding (Release 12), Jun. 2014.

3GPP TS 36.211 V12.1.0; Technical Specification; 3rd Generation Partnership Project; Technical Specification Group Radio Access Network; Evolved Universal Terrestrial Radio Access (E-UTRA); Physical channels and modulation (Release 12), Mar. 2014.

* cited by examiner

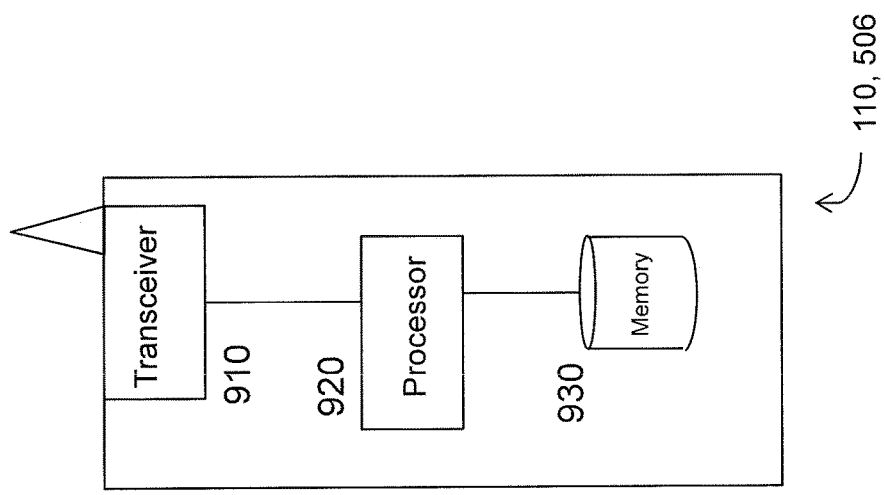

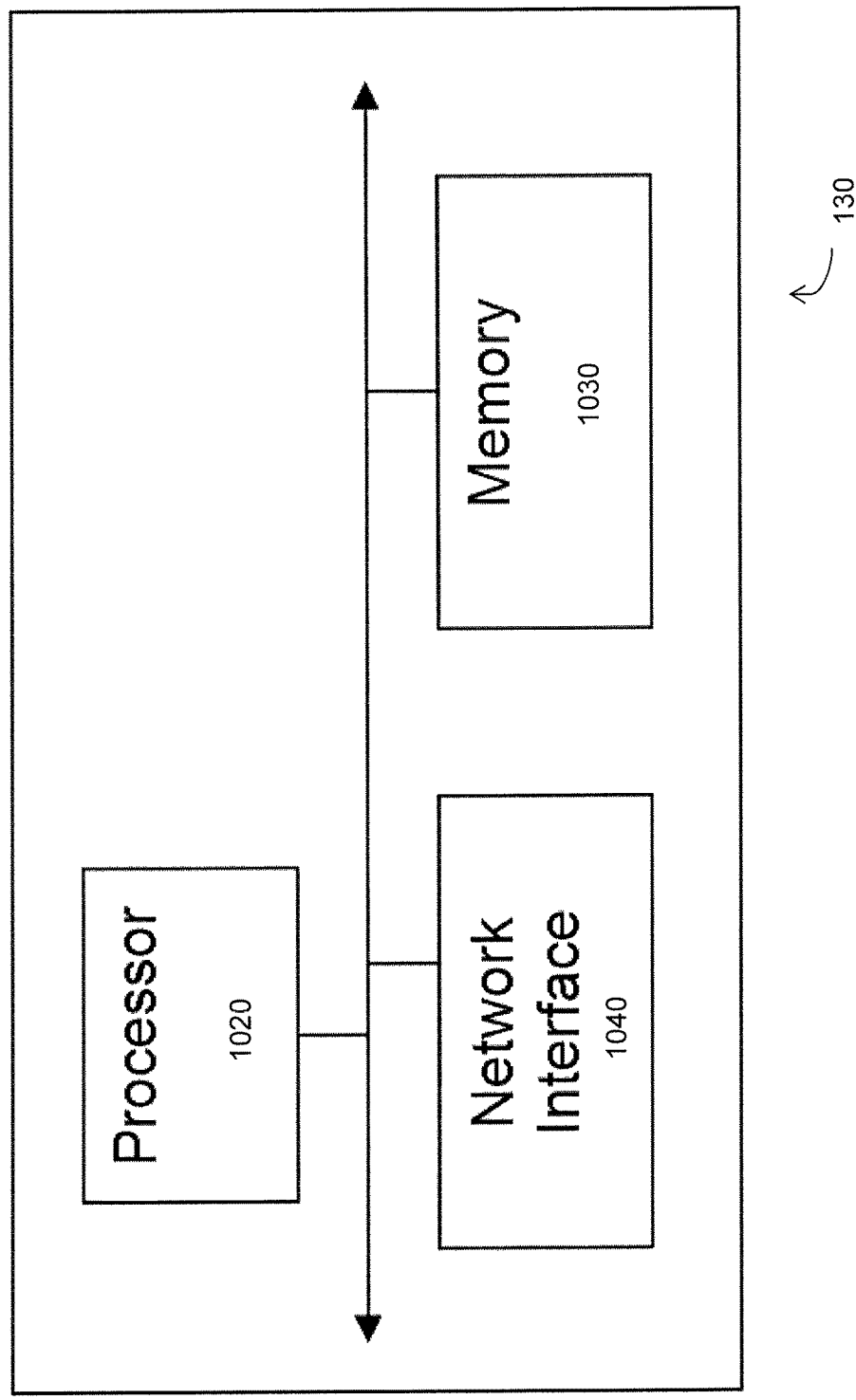

SYSTEM AND METHOD FOR TOGGLING TRANSMISSION PARAMETERS IN A HETEROGENEOUS NETWORK

PRIORITY

This nonprovisional application is a U.S. National Stage Filing under 35 U.S.C. § 371 of International Patent Application Ser. No. PCT/IB2014/065692, filed Oct. 29, 2014 and entitled "System and Method for Toggling Transmission Parameters in a Heterogeneous Network".

TECHNICAL FIELD

Particular embodiments relate generally to wireless communications and more particularly to a system and method for toggling transmission parameters in a heterogeneous network.

BACKGROUND

To meet higher capacity demands and to enhance user experience, cellular communications network are increasing the number of base stations employed. One approach for increasing the density of base stations is achieved by cell splitting macro cells in highly loaded geographical areas. Specifically, the macro cell may be split into multiple small cells in highly loaded geographical areas. Another approach for meeting high capacity demands is to employ a mixture of macro cells and small cells with overlapping coverage areas within the cellular network. This type of cellular network may be referred to as heterogeneous networks (HetNets). Such networks may be an important complement to macro cell splitting. One example includes a cellular network having clusters of pico cells within the macro coverage area to offload macro traffic. A pico base station provides service to a pico cell. Typically, a pico base station is a low power node (LPN) that transmits with low output power and covers a much smaller geographical area than a high power node, such as a macro base station. Other examples of low power nodes are home base stations and relays. This densification of the underlying support for the cellular network may allow radio resources to be reused. Additionally, because wireless devices may be closer to the serving base station, wireless devices may achieve higher bitrates. However, while the presence of additional base stations may increase system performance and improve user experience, inter-cell interference may be more pronounced.

Multiple-input multiple output (MIMO) systems employed at both the transmitter and the receiver may also be used to improve communication performance. Specifically, multiple antennas may be used at both the transmitter and the receiver to perform smart antenna functions. Such functions may include spreading the total transmit power over the antennas to achieve an array gain that incrementally improves the spectral efficiency (more bits per second per hertz of bandwidth) and/or achieves a diversity gain that improves the link reliability by reducing facing. In modern communication networks, MIMO is an essential element of wireless communication standards such as IEEE 802.11n (Wi-Fi), IEEE 802.11ac (Wi-Fi) 4G, 3GPP Long Term Evolution, WiMAX, and HSPA+.

In LTE MIMO systems, data is transmitted using transport blocks transmitted over a Physical Downlink Shared Channel (PDSCH). At the physical layer, transport blocks are converted into codewords. There are a number of steps involved in the conversion, depending on the length of the transport block. For example, a 24 bit checksum (CRC) may be appended to the transport block. This CRC may be used to determine whether the transmission was successful or not and may trigger Hybrid ARQ to send an ACK or NACK, as appropriate. As another example, the transport block may be segmented into code blocks, which may be between 40 and 6144 bits long. Additionally, the conversion may include the reassembling of the resulting code blocks into a single code word, which may be considered a transport block with error protection.

A wireless device that includes multiple antennas may be configured to receive multiple code words in a single transmission interval. For example, two code words can be independently transmitted on two or more transmit antennas over the same radio resources by mapping them on to two or more transmission layers. For example, in LTE open-loop spatial multiplexing, a.k.a. Transmission Mode 3 (TM3), when the channel conditions support multiple rank transmission, two code words may be transmitted using large delay cyclic delay diversity (CDD) over two layers. At the receiving wireless device, which may also be termed user equipment (UE), the two code words can be detected by receiving the signal using multiple receive antennas. Though these techniques are applicable to TM3, TM3 is just one example. The described techniques are equally applicable to any multi-input/multi-output transceiver mechanisms.

Typically the transmission parameters, such as the modulation and coding scheme (MCS), transmit power, and other parameters are determined and/or adapted by the network node at every transmission instant (every TTI or multiple TTIs) for a future downlink (DL) transmission based on the receiver performance feedback information received from the wireless device. In the case of TM3, there is one common Channel Quality Indicator (CQI) feedback for both the code words transmitted. However, the receive status of each code word (i.e. ACK/NACK feedback) may be transmitted over Physical Uplink Control Channel (PUCCH) or Physical Uplink Shared Channel (PUSCH) separately based on the wireless device category and the feedback setting. In one example, the network node may maintain two independent sets of transmission parameters for each code word. This will help to improve the overall spectral efficiency if the two code words are transmitted over two or more layers.

In a M×N MIMO system with M transmit antennas and N receive antennas, each code word may be encoded by a forward error correction (FEC) and symbol mapped based on the transmission parameter adjustments (i.e., modulation encoding scheme (MCS)) recommended by the link adaptation module. The precoding vector can be changed every TTI in a predefined way in accordance with the 3GPP LTE standards. The receiving wireless device typically estimates the channel rank and estimates the CQI. The code word receive status is decided after checking the CRC of each of the code word. The transmission parameters for the subsequent down link (DL) transmissions, for example MCS can be adjusted based on the CQI feedback and also considering the ACK/NACK status for each code word. However, the adjustment based on ACK/NACK feedback is typically slow.

Furthermore, and as discussed above with regard to heterogeneous networks, significant interference may be experienced from the neighboring cells. At the wireless device, each code word experiences different levels of inter-cell interference in a typical heterogeneous deployment even with a careful planning. Additionally, the average interference power experienced over the two data resource elements that are carrying the two code words may be significantly different due to path loss incurred over the link. These factors may result in the code words being associated with differing error rates. As a result, different ACK/NACKs may be received for a pair of code words.

SUMMARY

According to some embodiments, systems and methods are provided for toggling transmission parameters in a heterogeneous network. Specifically, network nodes may be configured to toggle the code word to transmission layer mapping in alternate transmissions.

In an example embodiment, a method for toggling transmission parameters in a heterogeneous network to achieve a target block error rate by a network node may include obtaining a signal-to-noise ratio (SINR) estimate from channel quality information for a downlink between a network node and a wireless device. For each of a first code word and a second code word to be transmitted on the downlink, a block error rate estimate may be obtained based on the SINR estimate. The network node may then determine at least one expected SINR for the first code word and the second code word. The at least one expected SINR may be determined as a function of the SINR estimate and the block error rate estimate. Based on the at least one expected SINR for the first code word and the second code word, a modulation and coding scheme (MCS) for obtaining a target block error rate may be selected. The network node may then transmit the first code word on a first transmission layer and the second code word on a second transmission layer during a first transmission time interval. In a second transmission time interval, the network node may transmit the first code word on the second transmission layer and the second code word on the first transmission layer.

In another example embodiment, a network node for toggling transmission parameters in a heterogeneous network to achieve a target block error rate includes memory containing executable instructions and one or more processors in communication with the memory. The one or more processors may be executed to cause the network node to obtain a SINR estimate from channel quality information for a downlink between a network node and a wireless device. For each of a first code word and a second code word to be transmitted on the downlink, the network node may obtain a block error rate estimate based on the SINR estimate. At least one expected SINR for the first code word and the second code word may be determined as a function of the SINR estimate and the block error rate estimate. Based on the at least one expected SINR for the first code word and the second code word, at least one modulation and coding scheme (MCS) for obtaining a target block error rate is selected. The network node may then transmit, at a first transmission time interval, the first code word on a first transmission layer and the second code word on a second transmission layer. At a second transmission time interval, the network node may transmit to the wireless device the first code word on the second transmission layer and the second code word on the first transmission layer.

In yet another example embodiment, a method for receiving toggled transmission parameters by a wireless device to achieve a target block error rate includes transmitting channel quality information for a downlink between a network node and the wireless device. The channel quality information may be transmitted to the network node. During a first transmission time interval, a first code word may be received from the network node on a first transmission layer and a second code word may be received on a second transmission layer. During a second transmission time interval, the first code word may be received from the network node on the second transmission layer and the second code word may be received on a first transmission layer.

In still another example embodiment, a wireless device for receiving toggled transmission parameters for achieving a target block error rate includes memory containing executable instructions and one or more processors in communication with the memory. The one or more processors may be executed to cause the wireless device to transmit, to a network node, channel quality information for a downlink between the network node and the wireless device. During a first transmission time interval, a first code word is received from the network node on a first transmission layer and a second code word is received on a second transmission layer. During a second transmission time interval, the first code word is received from the network node on the second transmission layer and the second code word is received on a first transmission layer.

Some embodiments of the disclosure may provide one or more technical advantages. For example, in certain embodiments, the toggling of code word to transmission layer mappings in alternating transmissions may enable a network node to determine a common downlink modulation and coding scheme for the code words. Another advantage may be that a target block error rate on both code words may be achieved. Another advantage may be that the toggling of code words to transmission layer mapping may be performed based on the expected variations in the communication channel.

Still another advantage may be that the interference experienced from neighboring cells may be mitigated even where the channel vector varies slowly as compared to the transmission interval, the precoding matrix is constant, the transmit power of CRS symbols is higher than the transmit power of a data symbol, or where low cell loading of a neighbor cell causes imbalance.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 9 is a block diagram illustrating certain embodiments of a wireless device, according to certain embodiments; and FIG. 10 is a block diagram illustrating certain embodiments of a core network node, according to certain embodiments.

DETAILED DESCRIPTION

Systems and methods are provided for toggling transmission parameters in a heterogeneous network. Specifically, network nodes may be configured to toggle the code word to transmission layer mapping in alternate transmissions. As a result, a common downlink modulation and coding scheme may be identified for the code words and a target block error rate may be achieved.

Figure 1:
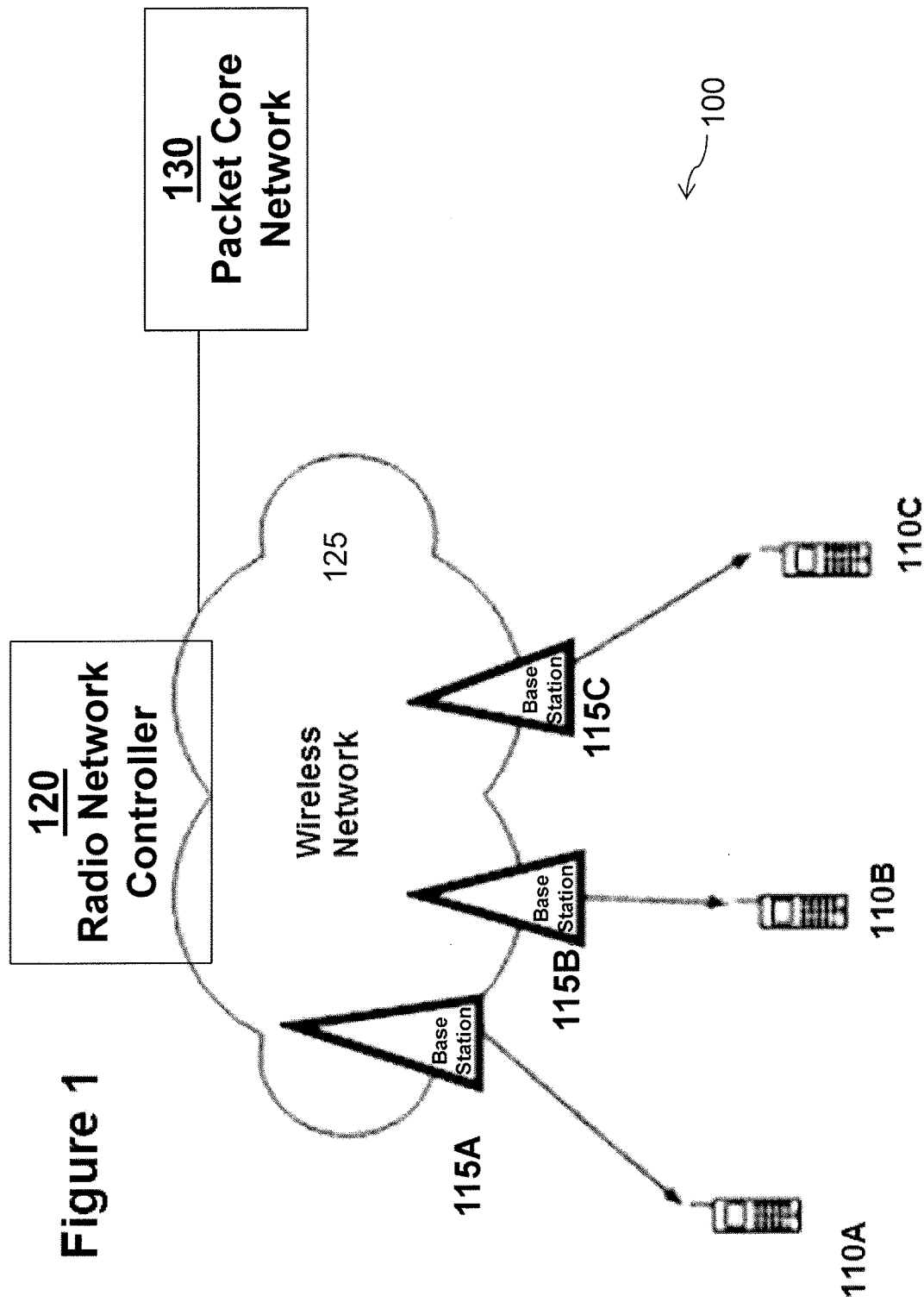
FIG. 1 is a block diagram illustrating embodiments of a radio network for toggling transmission parameters, according to certain embodiments.

FIG. 1 is a block diagram illustrating embodiments of a radio network 100 for toggling transmission parameters that includes one or more wireless devices 110, radio network nodes or Base Stations 115, radio network controller 120, and core network nodes 130 that communicate with one another via a wireless network 125. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 and/or radio network controller 120 using the non-access stratum layer. In non-access stratum signaling, signals between wireless device 110 and core network node 130 and/or radio network controller 120 may be transparently passed through the radio access network and network node 115.

As described above, example embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of radio network node 115, wireless device 110, and network nodes (such as radio network controller 120 or core network node 130) are described with respect to FIGS. 8, 9, and 10 below, respectively.

The terms wireless device 110 and network node 115, as used herein, are considered general terms and are intended to be considered as non-limiting. For example, "network node" may correspond to any type of radio network node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as 3GPP Long Term Evolution (LTE) technology, which is a mobile broadband wireless communication technology in which transmissions from radio network nodes 115, which may include base stations such as those referred to as eNBs in particular embodiments, to wireless devices, which may also be referred to as user equipment (UE), are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers per OFDM symbols and 7 OFDM symbols (one slot). A unit of one subcarrier and 1 OFDM symbol is referred to as a resource element (RE). However, it is generally recognized that the disclosure is not limited to 3GPP LTE or other provided examples and other embodiments could use different radio access technologies.

Figure 2:
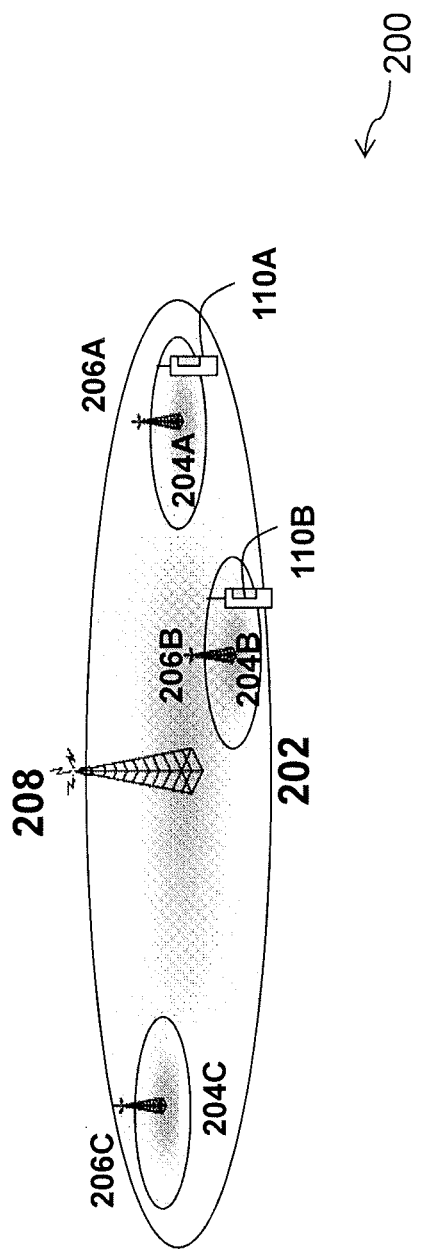
FIG. 2 is a schematic diagram of an embodiment of a heterogeneous network for toggling transmission parameters, according to certain embodiments.

In certain embodiments, the network may comprise a heterogeneous network that includes a mixture of cells of different sizes and overlapping coverage areas. FIG. 2 is a schematic diagram of an example wireless telecommunications network 200 deploying macro cells 202 and pico cells 204, according to certain embodiments. As illustrated, network 200 includes one macro cell 202 that includes multiple pico cells 204A-C deployed within the coverage area of macro cell 202.

In particular embodiments, pico cells 204A-C may be served by lower power nodes 206A-206C that consume less power than network node 208. For example, whereas network node 208 serving macro cell 202 may be served by a node with an output power of 46 dBm, a lower power node 206A-C may be served by a node with an output power of 30 dBm or less. The large difference in output power may result in a different interference situation than what is seen in networks where all base stations have the same output power. Other examples of low power nodes, also referred to as nodes, in heterogeneous networks are home base stations and relays.

In certain embodiments, network 200 may include an LTE network employing MIMO-enabled transmitters and receivers. Thus, network nodes 206A-C may be equipped with multiple antennas for transmitting signals to and receiving signals from wireless devices 110A-C. Likewise, wireless devices 110A-C may be equipped with multiple antennas for receiving signals from and transmitting signals to network nodes 206A-C. In such a system, a network node 206A-C may independently transmit two code words on two or more transmit antennas over the same radio resources by mapping the code words onto two or more transmission layers. For example, in LTE open-loop spatial multiplexing network such as Transmission Mode 3 (TM3), a network node 206A-C may transmit the two code words using large delay cyclic delay diversity (CDD) over two transmission layers. A wireless device 110A-C in communication with the transmitting network node 206A-C may receive the signal using multiple receive antennas and detect the two code words. Though certain aspects of the techniques described herein may be described as being applicable to TM3, it is recognized that TM3 is merely provided as an example communication network. The methods, apparatus, and techniques described herein are applicable to any multi-input/multi-output transceiver system.

In certain embodiments, network nodes 206A-C may configure the transmission parameters for transmission time intervals for future downlink (DL) transmissions based on the performance feedback received from wireless devices 110A-C. In particular embodiments, the transmission parameters may include the modulation and coding scheme (MCS) and/or transmit power.

In a particular embodiment, the wireless device 110A-C may be computing and reporting back one common Channel Quality Indicator (CQI) feedback for both the code words transmitted. However, the receive status of each code word may be reported back by a wireless device 110A-C separately. Stated differently, wireless device 110A-C may report an acknowledgement (ACK) or negative-acknowledgement (NACK) feedback for each code word received from a network node 206A-C. In certain embodiments, the ACKs or NACKs may be transmitted over a Physical Uplink Control Channel (PUCCH) or a Physical Uplink Shared Channel, as determined based on the category and/or feedback settings for the wireless device 110A-C.

Figure 3:
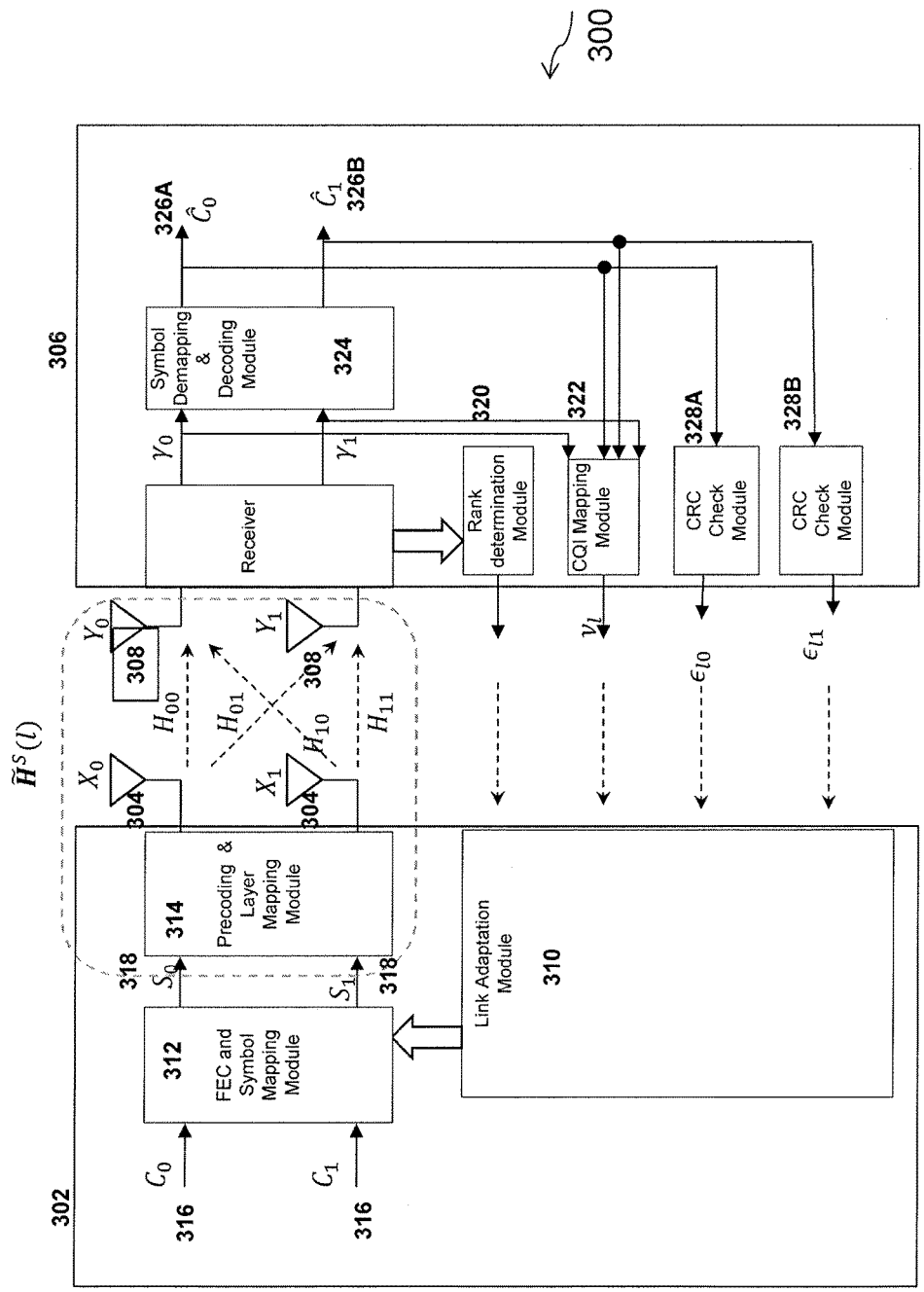
FIG. 3 is a schematic diagram of a link adaptation procedure that may be employed by a communications network using MIMO-enabled devices, according to certain embodiments.

In certain embodiments, network nodes 206A-C may maintain two independent sets of transmission parameters for each code word. This will help to improve the overall spectral efficiency if the two code words are transmitted over two or more layers and if the channel conditions are amenable to rank γ (γ≥2) transmission. FIG. 3 depicts a schematic diagram of a link adaptation procedure that may be employed by a communications network 300 using MIMO-enabled devices, according to certain embodiments. Specifically, network 300 is a M×N MIMO system. Thus, network 300 includes a MIMO-enabled network node 302 having M transmit antennas 304 and a MIMO-enabled wireless device 306 having N receive antennas 308. In the depicted embodiment, network node 302 has two transmit antennas 304A-B, and wireless device 306 has two receive antennas 308A-B. However, it is recognized that the devices may have any appropriate number of antennas.

As depicted, network node 302 has a link adaptation module 310, FEC and Symbol mapping module 312, and a precoding and layer mapping module 314. In certain embodiments, each code word 316, $\{C_i, i=0, 1\}$, for transmission by network node 302 may be encoded by forward error correction (FEC) and mapped based on the transmission parameter adjustments (i.e., modulation and coding scheme (MCS)) by FEC and Symbol Mapping Module 312. The output of FEC module 312 is symbol vectors 318, $\{S_i, i=0, 1\}$, that are provided to Precoding and Layer Mapping Module 314.

In certain embodiments, Precoding and Layer Mapping Module 314 processes the symbol vectors 318 to generate transmission vectors to be transmitted by transmit antennas 304. In a particular embodiment, for example, the transmission vectors to be transmitted by the M transmit antennas, obtained after precoding and layer mapping 314 at the lth transmission time interval (TTI), X(l) can be expressed as follows:

$$X_{M \times N_S}(l) = P_{M \times 2}(l) S_{2 \times N_S}$$

where $P_{M \times 2}(l)$ represents the layer mapping and precoding operation performed by Precoding and Layer Mapping Module 314 during the $l^{th}$ transmission time interval (TTI) with M rows and 2 columns $$S_{2 \times N_S} = \begin{bmatrix} S_0 \\ S_1 \end{bmatrix}$$

is the symbol vector at the output of the FEC and symbol mapping module 312. Here $N_S$ represents the length of the vectors $S_0$ and $S_1$. As shown in the above equation and as may be recognized, the precoding vector may be changed every TTI in a predefined way in accordance with the 3GPP LTE standards. It is possible to transmit multiple code words within a TTI. The precoding vector $P_{M \times 2}(l)$ is the same for all the code words transmitted in the lth TTI.

The complex baseband equivalent of the received signal vectors at the N receive antennas 308 of wireless device 306 at the lth transmission time interval (TTI) may be expressed as follows:

$$Y_{N \times N_S}(l) = H_{N \times M}^S(l) P_{M \times 2}(l) S_{2 \times N_S}$$

where $H_{N \times 2}^S(l)$ represents the channel vector between network node 302 and wireless device 306 during the $l^{th}$ TTI with N rows and M columns. However, this equation may be simplified as follows:

$$Y_{N \times N_S}(l) = \tilde{H}_{N \times 2}^S(l) S_{2 \times N_S}$$

where $\tilde{H}^S(l)$ represents the composite channel vector including the precoding operation during the $l^{th}$ TTI with N rows and two columns. In the example illustrated in FIG. 3, the number of receive and transmit antennas are shown as 2, i.e. N=2 and M=2 and;

$$H_{2\times 2}^S = \begin{bmatrix} H_{00} & H_{10} \\ H_{01} & H_{11} \end{bmatrix}$$

As depicted in FIG. 3, wireless device 306 may include a Rank Determination Module 320 for estimating the channel rank from the performance metrics of the symbol detector. Wireless device 306 may also include a CQI Mapping Module 322 for estimating the channel quality information (CQI) from a Symbol Demapping & FEC decoding Module 324. The code word receive status may be decided after checking the CRC of each of the code word 326. Specifically, the two codewords 326A-B detected by wireless device 306 may be provided to CRC Checker Modules 328A-B, respectively. It may be noted that the performance metrics obtained by Rank Determination Module 330 and CQI Mapping Module 322 may be based on the symbol detection and may be performed even when there is no wireless device specific packet transmission and no code words detected.

In certain embodiments, the transmission parameters, for example MCS for the future DL transmissions may be adjusted based on the CQI feedback at lth TTI, $v_l$, and the ACK/NACK status for each code word. Stated differently, wireless device 306 may provide the CQI feedback at the lth TTI, $v_l$, and the ACK/NACK status to network node 302. Network node 302 may then adjust the transmission parameters accordingly. However, it may be generally recognized that the adjustment based on ACK/NACK feedback is normally slow.

Figure 4:
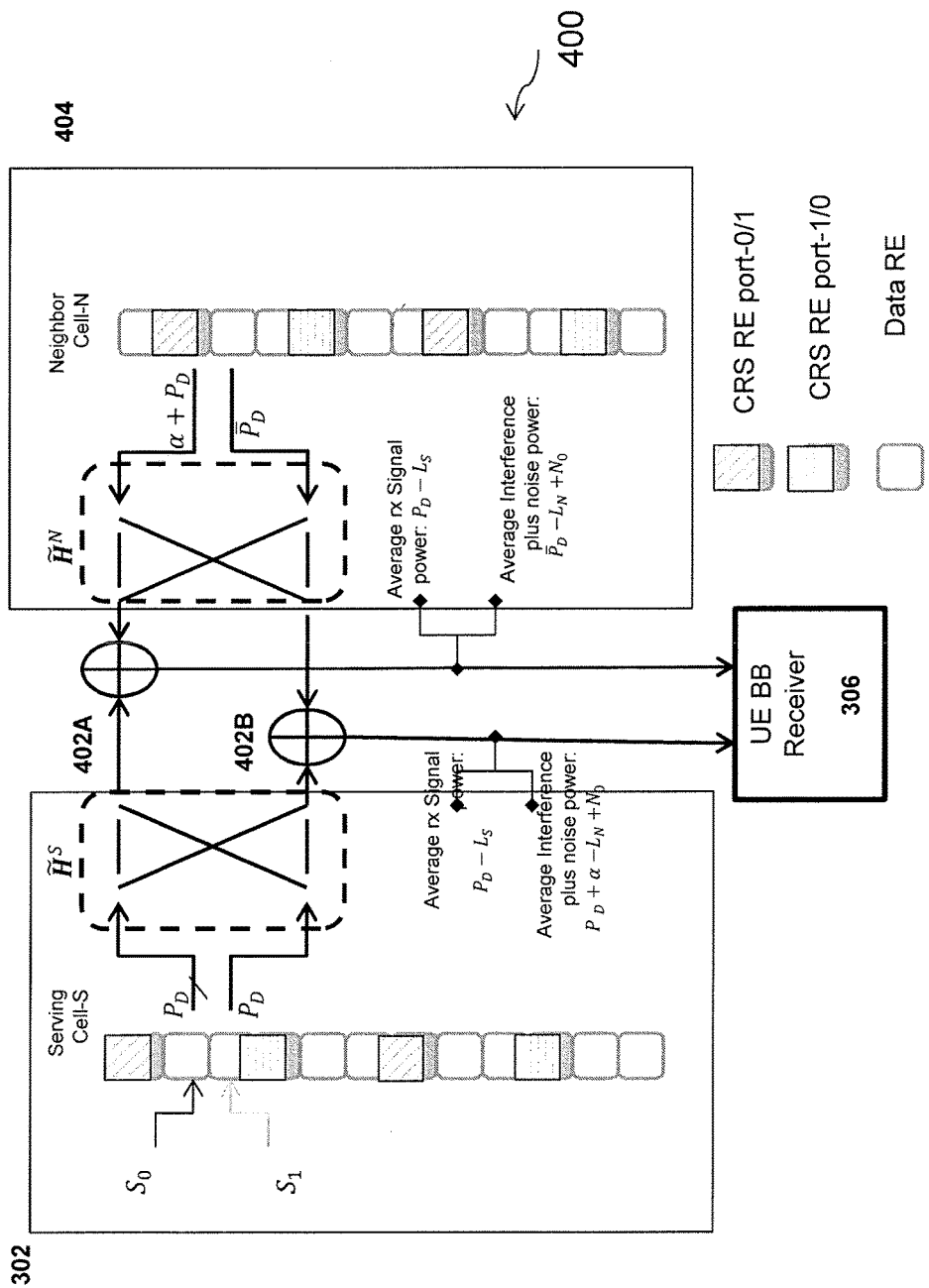
FIG. 4 is a schematic diagram illustrating an example system that includes a wireless device receiving a pair of code words from a network node, according to certain embodiments.

Additionally, in a typical heterogeneous network, interference caused by the neighboring cells may affect each code word differently. Thus, each one of a pair of transmitted code words may be affected by neighboring interference to a different extent. For example, some of the resource elements (REs) carrying the data symbols may experience significant interference from the neighbor cell REs carrying the CRS symbols. FIG. 4 depicts a schematic diagram illustrating an example signal-interference-to-noise ratio (SINR) imbalance that may be experienced by a wireless device receiving a pair of code words in a heterogeneous network, according to certain embodiments.

Specifically, FIG. 4 includes a system 400 that includes a wireless device, such as wireless device 306 of FIG. 3, receiving a pair of code words 402A and 402B from a network node, such as network node 302 of FIG. 3. In the illustrated embodiment, however, code words 402A-B are affected by the presence of CRS interference from a signal transmitted by network node 404 of a neighboring cell. Specifically, each code word 402A-B may experience different levels of inter-cell interference. For example, when the composite channel matrix is quasi-static or does not change rapidly over consecutive TTIs, the following may be true with regard to the composite channel vectors:

$$\tilde{H}_{N\times 2}^S(l) = \tilde{H}_{N\times 2}^S$$

In this scenario, the average interference experienced over the two data resource elements carrying the two code words 402A and 402B may be significantly different. As a result, the received signal power at wireless device 306 from network node 302 over the two resource elements (carrying the symbols $S_0$ and $S_1$ in FIG. 4) may be expressed as follows:

$$P_D - L_S$$

where $P_D$ is the transmit power level set by the serving network node 302 and $L_S$ is the path loss incurred over the link. Similarly, the average interference level experienced over the received resource element (k,j), $I_{kl}$ may be expressed as follows: (here, k and j represent the subcarrier and the OFDM symbol in a subframe)

$$I_{kj} = \begin{cases} \overline{P}_D + \alpha - L_N + N_0 & \text{for } k\%3 \neq d_S\%3 \text{ and } k\%3 = d_N\%3 \\ \overline{P}_D - L_N + N_0 & \text{for } k\%3 \neq d_S\%3 \text{ and } k\%3 \neq d_N\%3 \end{cases}$$

for j=0, $N_{symb}^{DL}$-3 for two transmit antennas and for j=0,1, $N_{symb}^{DL}$-3 for more than two transmit antennas. According to the 3GPP TS 36.211 v12.1.0: LTE Physical Channels and Modulation Specification, RS symbol is transmitted over RE(k,j) when the frequency index of the RE, k meets the criterion (k %3)=(cell$_{ID}$%3), where cell_ID is the identity of the cell configured by the LTE network operator. The first condition in the above equation, k % 3≠$d_S$% 3 and k % 3=$d_N$ % 3 can be interpreted as the RE(k,j) is radio resource over which serving cell transmits a data RE and the neighbor cell transmits reference symbol. The second condition in the above equation, k % 3≠$d_S$ % 3 and k % 3=$d_N$ % 3 can be interpreted as the RE(k,j) is radio resource over which serving cell transmits a data RE and the neighbor cell also transmits data RE (or doesn't transmit anything if the resource is not assigned to any DL transmission). This explanation is equally applicable to a four transmit antenna case also. In general, this is applicable any number of transmit antennas when transmissions on different radio resources in a subframe consistently experience different levels of inter-cell interference over an extended time. The symbol "%" indicates the modulo operation, where:

$L_N$ is the path loss incurred during the transmission from the neighbor network node 404 to wireless device 306, α represents the power boosting employed for cell specific reference symbol transmission compared to the data RE transmission, $d_S$ and $d_N$ $d_S$ are the cell IDs of the serving cells associated with network node 302 and network node 404 of neighboring cell of the interfering, neighboring cell, $\overline{P}_D$=E[$P_D$] is the average transmit power of the data RE from the neighbor cell over $j^{th}$ OFDM symbol. Note that $\overline{P}_D$ depends on the neighbor cell loading, i.e. average power level depends on the probability that this RE is allocated to DL transmission. We assume $\sigma_S^2$=E[|$S_i$|$^2$]=1.

In certain embodiments, it may be desirable to have the error rate performance of each code word 402A and 402B to be the same. When code words 402A and 402B are transmitted over two layers, the average received SINR at wireless device 306 must be roughly the same to guarantee that the error rate performance of each code word 402A and 402B is the same. However, as depicted in FIG. 4, if there is CRS interference from a neighbor cell such that the $d_S$%3≠$d_N$%3, one of the resource elements carrying a code word 402A or 402B may experience more interference than the other. Conditions that may lead to more interference being experienced by one code word 402A or 402B may include:

The channel represented by $H^S$ is very slowly varying compared to the TTI.

The precoding matrix P is constant.

The transmit power of CRS symbols is higher than the transmit power of a data symbol.

The imbalance will be more when the neighbor cell loading is low. The cell loading can be interpreted as average utilization of available radio resources for DL transmission by a network node.

Figure 5:
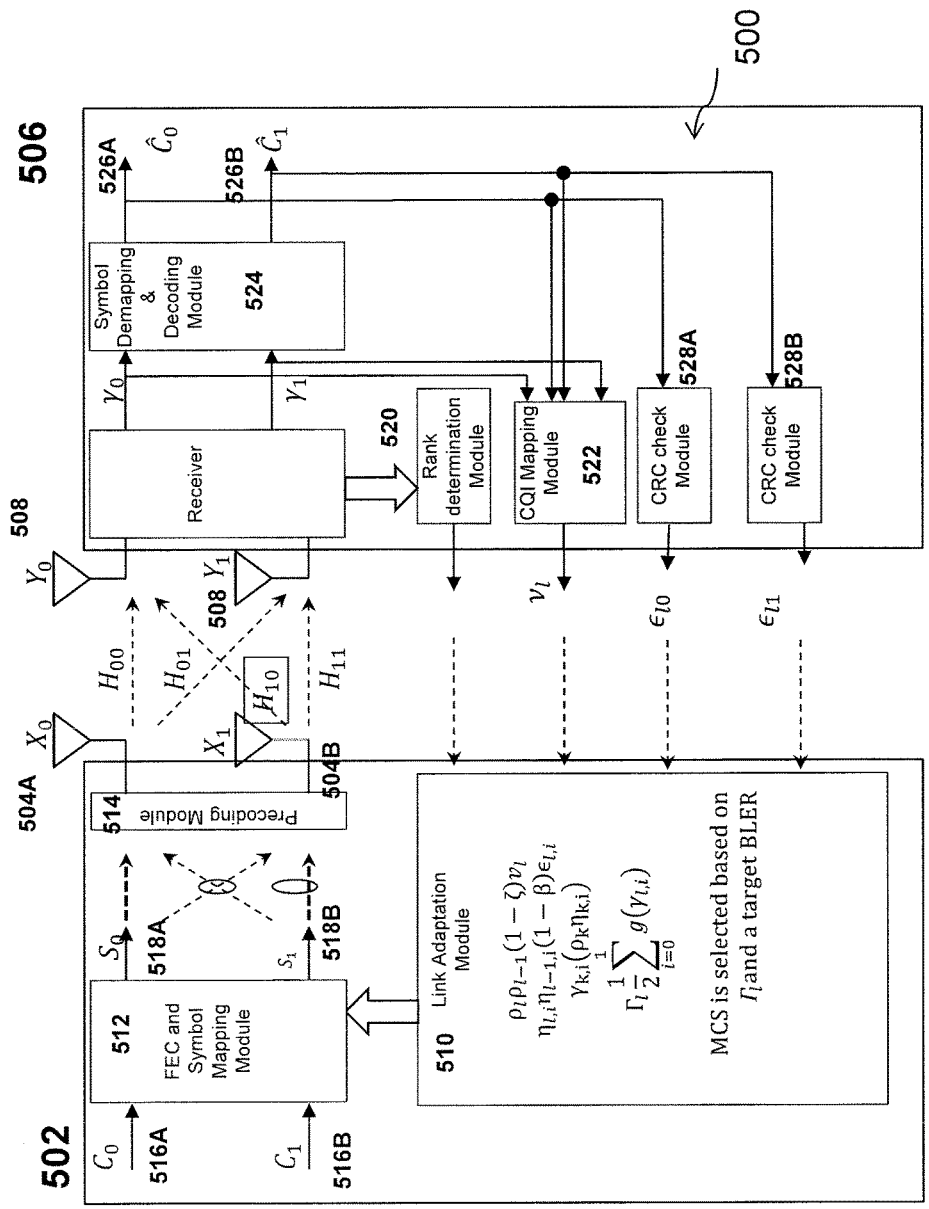
FIG. 5 is a schematic diagram of a network configured to perform a link adaptation procedure that includes toggling transmission parameters to ensure target block error rates (BLER) of a pair of code words, according to certain embodiments.

FIG. 5 depicts a schematic diagram of a network 500 configured to perform a link adaptation procedure that includes toggling transmission parameters to ensure target block error rates (BLER) of a pair of code words, according to certain embodiments. In certain embodiments, when the channel conditions are not changing significantly, the code words to transmission layer mapping can be toggled every transmission opportunity to ensure that the target BLER is achieved for both the code words. As will be described in more detail below, this may be achieved by toggling the transport block to code word swap flag included in the downlink control information (DCI).

Though it is recognized that network 500 may include any M×N MIMO system, communications network 500 is depicted as including a 2×2 MIMO system. Thus, network 500 includes a MIMO-enabled network node 502 having 2 transmit antennas 504 and a MIMO-enabled wireless device 506 having 2 receive antennas 508.

Similar to network node 302 of FIG. 3, network node 502 has a link adaptation module 510, FEC and Symbol mapping module 512, and a precoding and layer mapping module 514. In certain embodiments, each code word 516, $\{C_i, i=0, 1\}$, received by network node 502 may be encoded by forward error correction (FEC) and mapped based on the transmission parameter adjustments (i.e., modulation and coding scheme (MCS)) by FEC and Symbol Mapping Module 512. The output of FEC module 512 is symbol vectors 518, $\{S_i, i=0, 1\}$, that are provided to Precoding and Layer Mapping Module 514.

Similar to wireless device 306 depicted in FIG. 3, wireless device 506 may include a Rank Determination Module 520 for estimating the channel rank from the performance metrics of the symbol detector. Wireless device 506 may also include a CQI Mapping Module 522 for estimating the channel quality information (CQI) from a Symbol Demapping & FEC decoding Module 524. The code word receive status may be decided after checking the CRC of each of the code word 526A-B. Specifically, the two codewords 526A-B detected by wireless device 506 may be provided to CRC Checker Modules 528A-B, respectively. It may be noted that the performance metrics obtained by Rank Determination Module 520 and CQI Mapping Module 522 may be based on the symbol detection and may be performed even when there is no wireless device specific packet transmission and no code words detected.

Unlike Link Adaption Module 310, however, Link Adaption Module 510 is configured to independently adapt the MCS for each code word based on the ACK/NACK feedback received for each code word from wireless device 506. For example, where network system 500 is a TM3 communications network, the MCS on each layer can be independently adapted even though the CQI is decided at wireless device 506 by observing the average SINR at wireless device 506.

In a particular embodiment, link adaption module 510 may be configured to determine a SINR estimate from the CQI received from wireless device 506. The SINR value may indicate the average channel conditions. For example, link adaptation module 510 may determine an SINR estimate from the CQI received from wireless device 506 as follows:

$$\rho_l = \zeta \rho_{l-1} + (1-\zeta)v_l$$

where:
- $\rho_l$ is the SINR estimate during the $l^{th}$ TTI;
- $v_l$ is the SINR derived from the CQI received during the lth TTI;
- $\zeta$ is the forgetting factor and can be set zero if there is no necessity for filtering of the reported CQI (such as where wireless device 506 may be assumed to do this operation to derive the CQI).

In certain embodiments, Link Adaptation Module 510 may also be configured to calculate a BLER estimate for each of the code words 516. In particular embodiments, the BLER estimate may be calculated as follows:

$$\eta_{l,i} = \beta \eta_{l-1,i} + (1-\beta)\epsilon_{l,i}$$

where:
- $\eta_{l,i}$ is the BLER estimate for the $i^{th}$ code word 516 during the $l^{th}$ TTI. $\epsilon_{l,i}$ $\epsilon_k$ is the a metric derived from the ACK/NACK on the $i^{th}$ code word received during the $l^{th}$ TTI. $\beta$ is the forgetting factor.

In certain embodiments, Link Adaptation Module 510 may also determine the expected SINR for each code word based on the CQI and additional adjustment needed to guarantee a target BLER. In a particular embodiment, the expected SINR for each code word may be determined as follows:

$$\gamma_{l,i} = f(\rho_l, \eta_{l,i})$$

Function $f()$ is a function determining the SINR for each code word based on the SINR and BLER estimates. For example, $f()$ can be a linear function which adds the scaled input parameters:

$$\gamma_{l,i} = A\rho_l + B\eta_{l,i} + c$$

Where A, BA and C are the scaling parameters. From these estimated SINR values, an appropriate MCS may be selected to meet the required BLER target for each code word. Alternatively, a common MCS may be selected based on the average channel conditions feedback from wireless device 506. An average SINR, $\gamma_k$, may be obtained by averaging BLER estimates over the two code words as follows:

$$\gamma_l = f\left(\rho_l, \frac{\eta_{l,0} + \eta_{l,1}}{2}\right)$$

However, determining an average SINR may not necessarily guarantee that the target BLER will be the same on both the code words.

Accordingly, to attain the same BLER on each code word 516, network node 502 may be configured to swap the code word to transmission layer mapping for each downlink transmission. Swapping the code word to transmission layer mapping may ensure that each code word experiences the average channel condition. Such a technique may be identical to the case where the precoding matrix is changed every transmission as follows:

$$P_0 = P \begin{bmatrix} 1 & 0 \\ 0 & 1 \end{bmatrix}$$

$$P_1 = P \begin{bmatrix} 0 & 1 \\ 1 & 0 \end{bmatrix}$$

As can be seen in FIG. 5, the symbol vectors 518A and 518B which correspond with codewords 516A and 516B may be swapped every other transmission time interval. For example, in a first transmission interval, first symbol vector 518A may be received by Precoding module 514 and transmitted to wireless device 506 via a first transmitter antenna 504A. In that same transmission interval, a second symbol vector 518B may be received by Precoding Module 514 and transmitted to wireless device 506 via a second transmitter antenna 504B. However, in a second transmission interval, first symbol vector 518A may be swapped with second symbol vector 518B such that first symbol vector 518A is transmitted to wireless device 506 via second transmitter antenna 504B and second symbol vector 518B is transmitted to wireless device 506 via first transmitter antenna 504A. In this manner, every odd/even transmission opportunity uses code word-i to layer –(i+1) %2 mapping for symbol vector 518A. However, every even/odd transmission opportunity uses code word-i to layer –i mapping. In a particular embodiment, the described toggling scheme may be performed by toggling the Transport block to code word swap flag in the DCI. In another embodiment, the described toggling scheme may be performed by changing the precoding matrix every TTI. The change of precoding matrix may be indicated to the wireless device. For example the usage precoding metrix, $P_0$ or $P_1$ usage based on the subframe number may be predefined in the standards. Alternatively, the precoding matrix may be indicated in the DCI format. In general the toggling can be employed randomly such that the channel conditions are equalized on both code word transmissions.

In a particular embodiment, the MCS may be adapted by determining the SINR based on the CQI feedback and then determining a Symbol Information (SI) metric, $g(\gamma_{l,i})$, independently for each code word. The average SI, $\Gamma_l$, may be used to determine an optimum MCS. The calculation for Lemma below shows that averaging the SI represents averaging the BLER:

$$\Gamma_l = \frac{1}{2}\sum_{i=0}^{1} g(\gamma_{l,i})$$

In particular embodiments, the symbol information according to the exponential effective SINR mapping (EESM) formulation may be approximated as follows:

$$S_i = m(1-e^{-\gamma_i}) \text{ for } i=0,1$$

where
 $S_i$ is the Symbol Information (SI);
 m is the number of bits in a symbol;
 $\gamma_i$ is the received SINR over the $i^{th}$ branch;

$$e^{-\gamma_i} = \left(1 - \frac{S_i}{m}\right)$$

$$\frac{1}{2}\sum_{i=0}^{1} e^{-\gamma_i} = 1 - \frac{1}{2}\sum_{i=0}^{1} \frac{S_i}{m}$$

$$m\left(1 - \frac{e^{-\gamma_0} + e^{-\gamma_1}}{2}\right) = \frac{1}{2}\sum_{i=0}^{1} \frac{S_i}{m}$$

From the above expression it is evident that the average of the SIs may represent the average BLER of the two channels.

Figure 6:
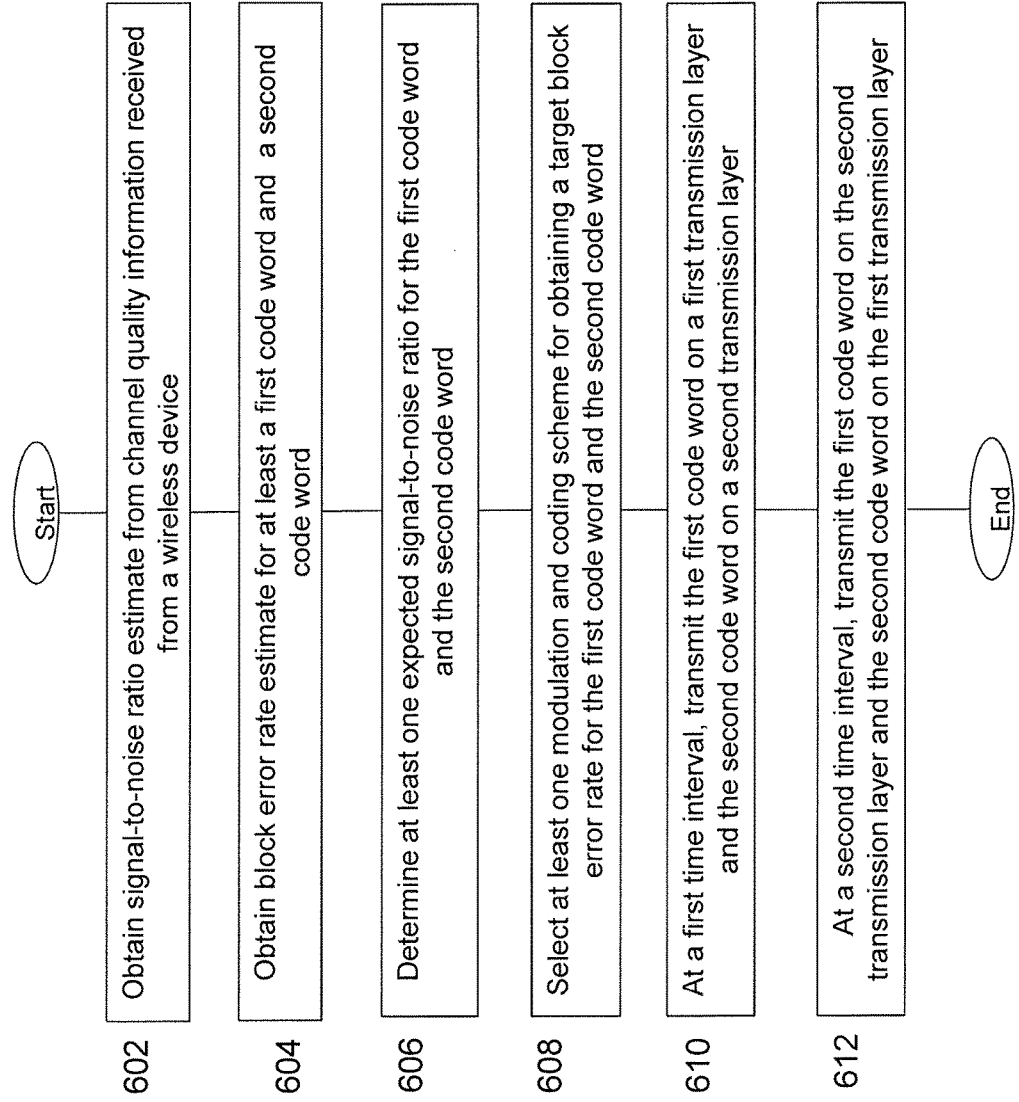
FIG. 6 depicts a method for toggling transmission parameters in a heterogeneous network to achieve a target block error rate by a network node, according to certain embodiments.

FIG. 6 depicts a method for toggling transmission parameters in a heterogeneous network 500 to achieve a target block error rate by a network node 502. The method may begin at step 602 when a SINR estimate is obtained from channel quality information for a downlink between network node 502 and a wireless device 506. In a particular embodiment, the SINR estimate may be obtained in response to receiving at least one CQI feedback for the first code word and the second code word and ACK/NACK feedback for the first code word and the second code word from the wireless device 506. The SINR estimate may represent average channel conditions on the downlink. In a particular embodiment, obtaining the SINR estimate may include applying a forgetting factor to a previous SINR estimate determined from a transmission time interval preceding the first transmission time interval.

At step 604, a block error rate estimate is obtained for each of a first code word and a second code word to be transmitted on the downlink. As described above, the block error rate estimate may be determined based on the SINR estimate determined at step 602.

At step 606, at least one expected SINR is determined for the first code word and the second code word. As described above, the at least one expected SINR may be determined as a function of the SINR estimate and the block error rate estimate. In a particular embodiment, the at least one expected SINR for the first code word and the second code word is determined by applying a scaling parameter to the block error rate estimate associated with the first code word and/or second code word and applying a scaling parameter to the SINR estimate. In a particular embodiment, determining the at least one expected SINR for the first code word and the second code word may include averaging the block error rate estimate for the first code word and the second code word to determine an average block error rate estimate and then calculating an average expected SINR for the first code word and the second code word based on the average block error rate estimate. In another particular embodiment, determining the at least one expected SINR for the first code word and the second code word may include determining a first expected SINR for the first code word based on a first block error rate associated with the first code word and then determining a second expected SINR for the second code word based on a second block error rate associated with the second code word.

At step 608, at least one MCS scheme may be selected for obtaining a target block error rate. As described above, the MCS scheme may be selected based on the at least one expected SINR for the first code word and the second code word.

During a first transmission time interval, the first code word is transmitted from the network node to the wireless device on a first transmission layer at step 610. During the same transmission time interval, the second code word is transmitted from the network node to the wireless device on a second transmission layer. Subsequently, and during a second transmission time interval, the first code word is transmitted from the network node to the wireless device on the second transmission layer at step 612. During the same transmission time interval, the second code word is transmitted from the network node to the wireless device on a first transmission layer. In a particular embodiment, a transport block to code word swap flag may be toggled in a downlink control information (DCI) format message to cause the transmission of the first code word on the second transmission layer and the second code word on a first transmission layer during the second transmission time interval. For example, the toggling of the transport block to code word swap flag may be with respect to a value of the transport block to code word swap flag in a DCI format message sent in the second transmission interval.

Certain embodiments may include the first transmission interval and the second transmission interval spanning a plurality of randomly selected consecutive transmission time intervals (TTIs) of 1 ms. Additionally or alternatively, the frequency of toggling of transport block to code word swap flag may be inversely proportional to expected transmission channel variations. The toggling of the transmission parameters may be performed in every subsequent transmission time interval. As a result, the first code word may be again transmitted on the first transmission layer and the second code word may be again transmitted on the second transmission layer during a third transmission time interval that occurs after the second transmission time interval.

Figure 7:
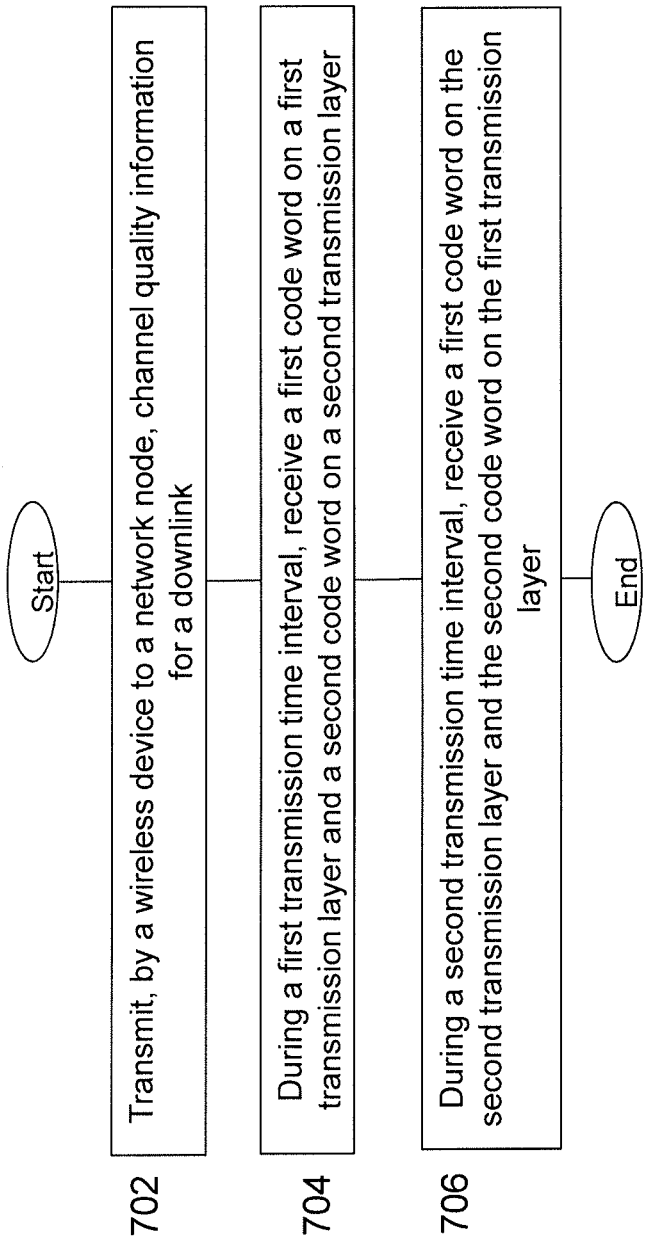
FIG. 7 depicts a method for receiving toggled transmission parameters by a wireless device to achieve a target block error rate, according to certain embodiments.

FIG. 7 depicts a method for receiving toggled transmission parameters by a wireless device 506 to achieve a target block error rate, according to certain embodiments. The method may begin at step 702 when wireless device 506 transmits channel quality information for a downlink between the network node 502 and the wireless device 506.

At step 704, wireless device 506 receives, during a first transmission time interval, a first code word on a first transmission layer and a second code word on a second transmission layer. Wireless device 506 receives, during a second transmission time interval at step 706, the first code word on the second transmission layer and the second code word on a first transmission layer. In a particular embodiment, a transport block to code word swap flag is toggled in a downlink control information (DCI) format message received at the wireless device to indicate that information received on the second transmission layer is the first code word and the information received on the first transmission layer is the second code word during the second transmission interval. In certain embodiments, the transmission of code words may be alternately toggled during each subsequent transmission time interval such that wireless device 506 receives, during a third transmission time interval, the first code word on the first transmission layer and the second code word on the second transmission layer.

Figure 8:
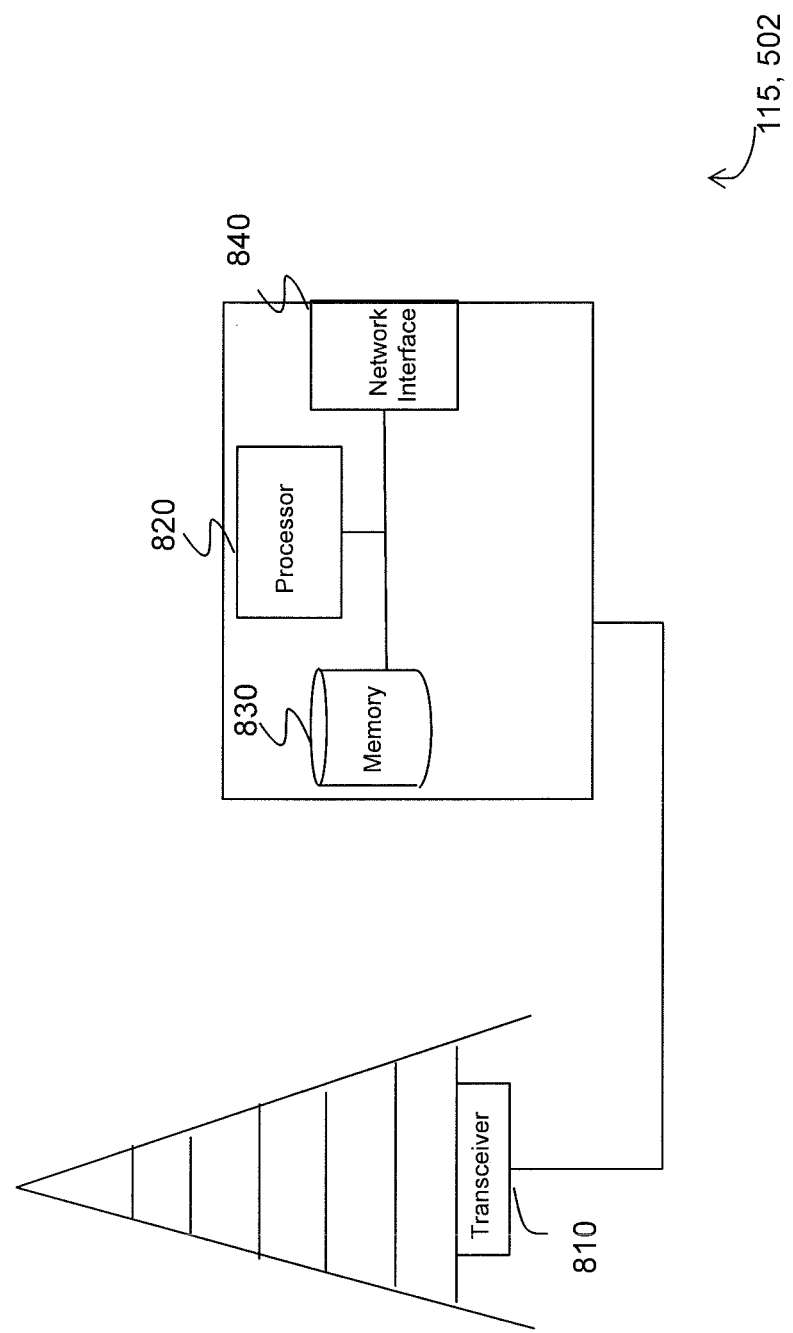
FIG. 8 is a block diagram illustrating certain embodiments of a radio network node, according to certain embodiments.

FIG. 8 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogenous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a radio network node 115, memory 830 stores the instructions executed by processor 820, and network interface 840 communicates signals to backend network components, such as a gateway, switch, router, Internet, Public Switched Telephone Network (PSTN), core network nodes 130, radio network controllers 120, etc.

Processor 820 may include any suitable combination of hardware and software implemented in one or more modules to execute instructions and manipulate data to perform some or all of the described functions of radio network node 115. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for radio network node 115, send output from radio network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of radio network node 115 may include additional components beyond those shown in FIG. 8 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 9 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 910, processor 920, and memory 930. In some embodiments, transceiver 910 facilitates transmitting wireless signals to and receiving wireless signals from radio network node 115 (e.g., via an antenna), processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above).

FIG. 10 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to a suitable node, such as a gateway, switch, router, Internet, Public Switched Telephone Network (PSTN), radio network nodes 115, radio network controllers 120, core network nodes 130, etc.

Processor 1020 may include any suitable combination of hardware and software implemented in one or more modules to execute instructions and manipulate data to perform some or all of the described functions of the network node. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, the toggling of code word to transmission layer mappings in alternating transmissions may enable a network node to determine a common downlink modulation and coding scheme for the code words. Another advantage may be that a target block error rate on both code words may be achieved. Another advantage may be that the toggling of code words to transmission layer mapping may be performed based on the expected variations in the communication channel.

Still another advantage may be that the interference experienced from neighboring cells may be mitigated even where the channel vector varies slowly as compared to the transmission interval, the precoding matrix is constant, the transmit power of CRS symbols is higher than the transmit power of a data symbol, or where low cell loading of a neighbor cell causes imbalance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The invention claimed is:

1. A method for toggling transmission parameters in a heterogeneous network to achieve a target block error rate by a network node, comprising:

obtaining, by a network node, a signal-to-noise ratio (SINR) estimate from channel quality information for a downlink between the network node and a wireless device;

for each of a first code word and a second code word to be transmitted on the downlink, obtaining, by the network node, a block error rate estimate based on the SINR estimate;

determining, by the network node, at least one expected SINR for the first code word and the second code word, the at least one expected SINR being determined as a function of the SINR estimate and the block error rate estimate;

based on the at least one expected SINR for the first code word and the second code word, selecting, by the network node, a common modulation and coding scheme (MCS) for the first code word and the second code word for obtaining a target block error rate;

at a first transmission time interval, transmitting, from the network node to the wireless device, the first code word on a first transmission layer using the common MCS and the second code word on a second transmission layer using the common MCS; and at a second transmission time interval, transmitting, from the network node to the wireless device, the first code word on the second transmission layer using the common MCS and the second code word on the first transmission layer using the common MCS;

wherein obtaining the SINR estimate comprises:
  receiving at least one channel quality indicator (CQI) feedback for the first code word and the second code word and acknowledgement/negative acknowledgement (ACK/NACK) feedback for the first code word and the second code word from the wireless device; and
  calculating the SINR estimate to represent average channel conditions on the downlink by looking up and SINR associated with the at least one CQI for the first code work, looking up an SINR associated with the at least one CQI for the second code cord, averaging the SINR associated with the first code word and the SINR associated with the second code word, and applying a forgetting factor to a precious SINR estimate determined from a previous transmission time interval.

2. The method of claim 1, wherein obtaining the SINR estimate comprises applying a forgetting factor to a previous SINR estimate determined from a transmission time interval preceding the first transmission time interval.

3. The method of claim 1, wherein determining the at least one expected SINR for the first code word and the second code word comprises:
  applying a first scaling parameter to the block error rate estimate associated with the first code word; and
  applying a second scaling parameter to the SINR estimate.

4. The method of claim 1, wherein determining at least one expected SINR for the first code word and the second code word comprises:
  averaging the block error rate estimate for the first code word and the second code word to determine an average block error rate estimate; and
  calculating an average expected SINR for the first code word and the second code word based on the average block error rate estimate.

5. The method of claim 1, wherein determining at least one expected SINR for the first code word and the second code word comprises:
  determining a first expected SINR for the first code word based on a first block error rate associated with the first code word; and
  determining a second expected SINR for the second code word based on a second block error rate associated with the second code word.

6. The method of claim 1, wherein a transport block to code word swap flag is toggled in a downlink control information (DCI) format message to cause the transmission of the first code word on the second transmission layer and the second code word on a first transmission layer during the second transmission time interval.

7. The method of claim 6, wherein the toggling of the transport block to code word swap flag is with respect to a value of the transport block to code word swap flag in a DCI format message sent in the second transmission interval.

8. The method of claim 1 further comprising:
  at a third transmission time interval, transmit, to the wireless device, the first code word on the first transmission layer using the common MCS and the second code word on the second transmission layer using the common MCS.

9. A network node for toggling transmission parameters in a heterogeneous network to achieve a target block error rate, the network node comprising:
  memory containing executable instructions; and
  one or more processors in communication with the memory, the one or more processors operable to execute the instructions to cause the network node to:
    obtain a signal-to-noise ratio (SINR) estimate from channel quality information for a downlink between the network node and a wireless device;
    for each of a first code word and a second code word to be transmitted on the downlink, obtain a block error rate estimate based on the SINR estimate;
    determine at least one expected SINR for the first code word and the second code word, the at least one expected SINR being determined as a function of the SINR estimate and the block error rate estimate;
    based on the at least one expected SINR for the first code word and the second code word, select a common modulation and coding scheme (MCS) for the first code word and the second code word for obtaining a target block error rate;
    at a first transmission time interval, transmit, to the wireless device, the first code word on a first transmission layer using the common MCS and the second code word on a second transmission layer using the common MCS; and
    at a second transmission time interval, transmit, to the wireless device, the first code word on the second transmission layer using the common MCS and the second code word on the first transmission layer using the common MCS;
  wherein the processor is operable to obtain the SINR estimate by:
    receiving at least one channel quality indicator (CQI) feedback for the first code word and the second code word and acknowledgement/negative acknowledgement (ACK/NACK) feedback for the first code word and the second code word from the wireless device; and
    calculating the SINR estimate to represent average channel conditions on the downlink by looking up an SINR associated with the at least one CQI for the first code word, looking up an SINR associated with the at least one CQI for the second code word, averaging the SINR associated with the first code word and the SINR associated with the second code word, and applying a forgetting factor to a previous SINR estimate determined from a previous transmission time interval.

10. The network node of claim 9, wherein obtaining the SINR estimate comprises applying a forgetting factor to a previous SINR estimate determined from a transmission time interval preceding the first transmission time interval.

11. The network node of claim 9, wherein determining the at least one expected SINR for the first code word and the second code word comprises:
    applying a first scaling parameter to the block error rate estimate associated with the first code word; and
    applying a second scaling parameter to the SINR estimate.

12. The network node of claim 9, wherein determining at least one expected SINR for the first code word and the second code word comprises:
    averaging the block error rate estimate for the first code word and the second code word to determine an average block error rate estimate; and
    calculating an average expected SINR for the first code word and the second code word based on the average block error rate estimate.

13. The network node of claim 9, wherein determining at least one expected SINR for the first code word and the second code word comprises:
    determining a first expected SINR for the first code word based on a first block error rate associated with the first code word; and
    determining a second expected SINR for the second code word based on a second block error rate associated with the second code word.

14. The network node of claim 9, wherein a transport block to code word swap flag is toggled in a downlink control information (DCI) format message to cause the transmission of the first code word on the second transmission layer and the second code word on a first transmission layer during the second transmission time interval.

15. The network node of claim 14, wherein the toggling of the transport block to code word swap flag is with respect to a value of the transport block to code word swap flag in a DCI format message sent in the second transmission interval.

16. The network node of claim 9, wherein the one or more processors are further operable to execute the instructions to cause the network node to:
    at a third transmission time interval, transmit, to the wireless device, the first code word on the first transmission layer using the common MCS and the second code word on the second transmission layer using the common MCS.

* * * * *